Nov. 13, 1962
J. F. SAVELL
3,064,162
SAFE LOAD CONTROL APPARATUS
Filed Dec. 19, 1958
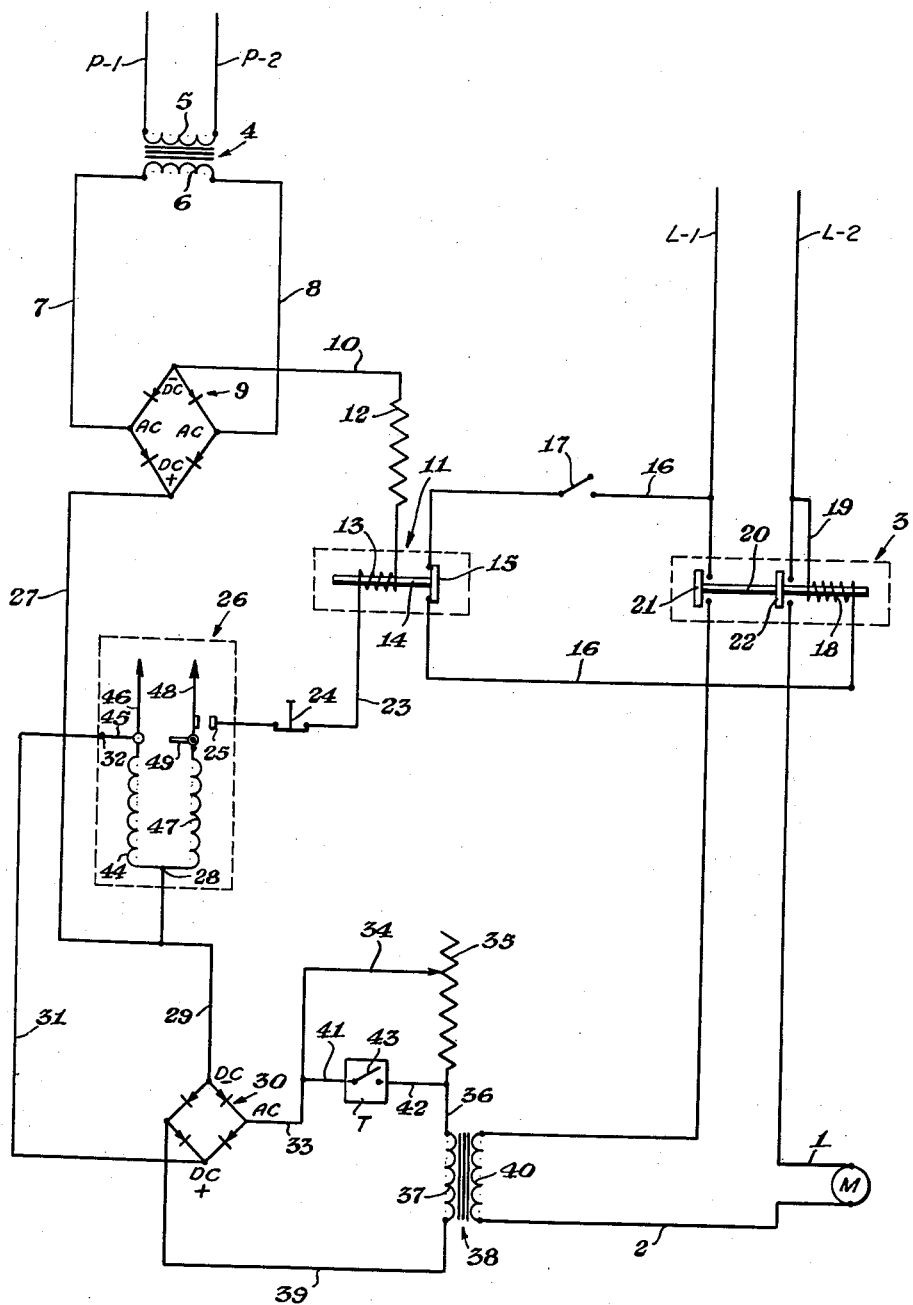
INVENTOR.
Jacob F. Savell
BY
Learman, Learman & McCulloch
ATTORNEYS

3,064,162
SAFE LOAD CONTROL APPARATUS
Jacob F. Savell, Saginaw, Mich., assignor to Baker Perkins, Inc., Saginaw, Mich., a corporation of New York
Filed Dec. 19, 1958, Ser. No. 781,751
9 Claims. (Cl. 317—13)

This invention relates to safe load control apparatus and more particularly to apparatus adapted to be incorporated in an electric motor circuit in such manner as to monitor the motor and cause it to cease operation whenever the load on the motor exceeds a predetermined value.

Various kinds of devices have been proposed heretofore for use in protecting an electric motor from overloads. Such devices customarily are used in conjunction with starting of a motor and are effective after a time delay or in response to the speed of the motor to interrupt the supply of power to the motor if the motor continues to draw a current approximating its starting current. While these devices are satisfactory for their intended purposes, they are directed primarily to protecting the motor. In many instances, the cost of the motor is but a small fraction of the cost of the equipment driven by the motor. Consequently, a device which aims primarily at protecting an electric motor may be incapable of functioning in time to prevent damage to the driven equipment.

In many cases a motor connected to a conveyor or the like and equipped with a starting overload control device will have an abnormal load imposed thereon. This abnormal load may be caused by many things, such as a breakdown or malfunction in the conveyor or other driven equipment, and will cause the motor to draw a higher current. A device aimed solely at protecting the motor from starting overload is incapable of responding to an abnormal load of the kind referred to and, as a result, serious damage to the driven equipment or the motor, or both, may be caused.

An object of this invention is to provide safe load control apparatus which is capable of responding to a predetermined value of current drawn by a motor to disconnect the motor from its operating source to protect the motor and equipment driven by the motor against damage.

Another object of the invention is to provide a motor control of the kind referred to which is capable of monitoring the current drawn by a motor so as to protect the motor and driven equipment from overloads not only during starting of the motor, but also throughout the operation of the motor.

A further object of the invention is to provide motor control apparatus which is capable of adjustment so as to vary the point at which the control apparatus becomes effective.

Other objects and advantages of the invention will be pointed out specifically or will become apparent from the following description when it is considered in conjunction with the appended claims and the accompanying drawing, which is a schematic diagram of motor overload control apparatus formed in accordance with the invention.

Overload control apparatus constructed in accordance with the invention is adapted for use in connection with an electric motor M or the like having wires 1 and 2 connected to the motor terminals and, in a manner yet to be described, to power lines L-1 and L-2 which, in turn, are connected to a source of power such as 220 volts alternating current through a starting relay 3 about which more will be said subsequently. The motor and its connections hereinafter will be referred to as the motor circuit.

The control apparatus includes a control transformer 4 having a primary winding 5 connected by power lines P-1 and P-2 to a second source of alternating current and a secondary winding 6 connected by wires 7 and 8 to the alternating current terminals of a rectifier bridge 9. From one of the direct current terminals of the rectifier 9 extends a wire 10 which is connected to a control relay 11 through a resistance 12. The relay 11 includes a winding 13 and an armature 14 having a switch head 15 adapted to bridge a pair of contacts located in a line 16 which is connected at one end to the relay 3 and at the other end to the power line L-1 through a starting switch 17. The relay 11 is so constructed and arranged in the disclosed embodiment that the armature part 15 constitutes a normally closed switch in the line 16. The starting relay 3 also forms part of the motor circuit and comprises a coil 18 connected at one end to the line 16 and at its other end to a wire 19 which, in turn, is connected to the power line L-2. Reciprocably mounted in the coil 18 is a plunger 20 having a pair of cross bars 21 and 22 which are adapted to bridge contacts located in the lines L-1 and L-2, respectively.

Extending from the control relay 11 and connected at one end to the coil 13 is a wire 23 in which is mounted a normally closed spring loaded switch 24. The other end of the wire 23 is connected to a terminal 25 mounted in a meter unit 26 which will be described in more detail hereinafter.

The other direct current terminal of the rectifier 9 is connected to a wire 27, the latter being connected to a binding post 28 extending into the meter device 26. From the binding post 28 extends another wire 29 which is connected to one of the D.C. terminals of a second rectifier bridge 30. The other D.C. terminal of the rectifier 30 is connected by a wire 31 to a second binding post 32 leading into the meter device 26. The two rectifiers and the parts connected thereto form what hereinafter will be referred to as a control circuit.

One of the A.C. terminals of the rectifier 30 is connected by a wire 33 to the movable terminal 34 of a variable resistance 35 such as a rheostat or potentiometer. From the resistance 35 leads a wire 36 which is connected to one end of the secondary coil 37 of a transformer 38, the other end of the coil 37 being connected by a wire 39 to the other alternating current terminal of the rectifier 30. The secondary coil 37 of the transformer 38 is energized by the primary coil 40 of the transformer which is connected at its ends to the motor wire 2 and to the power line L-1.

The apparatus includes a timing device T connected in parallel with the variable resistance 35 by means of wires 41 and 42, and the timing device includes a normally open switch 43 which is adapted to be closed by the timing device upon the expiration of a predetermined period of time. The timing device T and the parts to which it is connected to form a part of the circuit to the meter 26, the function of which will be explained hereinafter.

The meter device 26 is of known construction and comprises a meter coil 44 connected at one end to the binding post 28 and at the other end to the binding post 32 by means of a wire 45. Associated with the coil 44 is an indicating needle 46 which is mounted to swing back and forth across the face of a calibrated scale (not shown) according to the current flowing through the coil 44. The coil 44 derives its current from the same source as does the motor M, via the transformer 38 and the rectifier 30, so the current supplied to the meter circuit will have a definite and known relationship to the current supplied to the motor M. Thus, it can be said that the reading of the meter indicator 46 will be a measure of the current supplied to the motor M.

The meter 26 also includes a holding coil 47, one end of which is connected to the binding post 28 and the other end of which is connected to a current-conducting, needle-like maximum safe load indicating element 48 which is swingable to and fro under the influence of an adjusting device 49. The element 48 is adapted to be adjusted relatively to the meter scale so that it is located in the path of the indicating needle 46 when the latter moves from its "zero" or inactive position to indicate the value of current flowing through the meter device 26. The element 48 may be set to indicate any one of a number of current values on the scale and is so mounted with respect to the adjusting mechanism 49 that the meter needle 46 is capable of engaging the element 48 and moving the latter into engagement with the contact 25 should the deflection of the meter needle 46 be of such magnitude as to cause it to indicate a current value greater than the predetermined value indicated by the element 48. When the element 48 engages the contact 25, a circuit is completed through the elements of the control circuit connecting the two direct current terminals of the rectifier bridge 9.

When the apparatus is conditioned for operation, the starting switch 17 will be open, the starting relay 3 will have its contacts open, the switch device 11 will have its contact closed, and the timing device T will have its contact 43 open. The meter pointer 46 will indicate no current flowing through the meter device 26 and the indicating element 48 may be adjusted to indicate substantially the maximum safe load the motor M may carry, this load having previously been determined in a known manner and the appropriate corresponding value to be recorded on the meter 26 previously having been calculated.

As is well known, an electric motor requires a starting current which is quite high compared to its normal operating current. The high starting current frequently is higher than the safe load current on which the motor may operate for sustained periods, so it is important that the normal, high starting current not be permitted to actuate the overload control apparatus. This is achieved by the variable resistance 35 which can be so adjusted that, as long as the switch 43 in the timing device T is open, the current reaching the meter 26 must flow through the resistance 35 and will, therefore, have a lower value than it otherwise would have. Thus, the current delivered to the meter coil 44 from the rectifier 30 will be less than it would be if the resistance 35 were not in the circuit.

When it is desired to start the motor, the starting switch 17 is closed, thereby energizing the starting relay 3 to close the contacts 21 and 22 and permit current to be supplied to the motor M. Energization of the motor circuit will cause current to be induced in the meter circuit through the transformer 38. When sufficient time has elapsed to enable the motor M to have reached its normal operating speed, the timing device T will function to close the switch 43, thereby nullifying the resistance 35. The current-indicating needle 46 then will indicate a value which is a measure of the current being supplied to the motor M.

As long as the current supplied to the motor M is no greater than the meter value indicated by the element 48, the control circuit is inactive or disabled. Should the motor current reach a higher value than that for which the meter is set, either during its starting period or afterwards, the current indicating needle 46 will engage the element 48 and deflect it towards and into engagement with the contact 25. When contact is made between the element 48 and the contact 25, current is permitted to flow from the rectifier 9 through the control circuit and the flow of current through the control circuit will energize the relay coil 13 to cause the switch bar 15 to open the line 16. When this occurs, the starting relay 3 is deenergized and the contacts 21 and 22 open, thereby breaking the circuit to the motor M. When the supply of current to the motor M is broken, the meter needle 46 will return to its "zero" position. The indicator 48 will remain in contact with the part 25, however, by the action of the holding coil 47 which is energized by current flowing through the control circuit.

As long as the control circuit remains energized, the switch 15 will remain open so that the motor may not be started merely by closing the starting switch 17. To reset the switch 15 the push button 24 is depressed to break the flow of current through the coils 13 and 47. When the switch 24 is depressed, the coil 47 releases the element 48 and permits it to return to the position at which it originally was set. The switch 24 preferably is spring loaded to return to its closed position when it is released.

If desired, a visual or aural alarm signal may be included in the apparatus, but is not disclosed in the drawing since it forms no part of the invention per se.

When the operation of the motor has ceased due to operation of the control apparatus, the person in charge of the apparatus may investigate the cause of the overload and take remedial action.

A particular advantage of control apparatus made in accordance with the invention is that one unit is readily adaptable for use in conjunction with any one of a large number of motors having different ratings and characteristics. This is due to the ability of the resistance 35 and the indicating element 48 to be varied to complement one another. Thus, devices made according to the invention may be manufactured on a large scale with the assurance that each will perform its function even though it has not been built for use in conjunction with any particular motor rating.

The disclosed embodiment is representative of a presently preferred form of the invention, but is intended to be illustrative rather than definitive thereof. The invention is defined in the claims.

I claim:

1. Overload control apparatus for an electric motor, said apparatus comprising a motor circuit including a normally closed switch device connecting said motor to a source of electrical energy; start and stop switch means in said circuit adapted selectively to connect and disconnect said motor to and from said source; current-measuring means connected at all times to said motor circuit and operable to measure the current supplied thereto; a normally disabled control circuit; and means connecting said control circuit to a source of electrical energy for operation independently of said motor circuit, said control circuit including means operable in response to the current in said motor circuit reaching a predetermined value to energize said control circuit, said control circuit from its said source of energy including means operable in response to energization of said control circuit to open and hold open said normally closed switch device in said motor circuit and disconnect the latter from its source of energy.

2. The apparatus set forth in claim 1 including means forming part of said current measuring means for varying the measured value of the current supplied to said motor circuit.

3. The apparatus set forth in claim 2 including means forming part of said current measuring means for shunting said variable means.

4. The apparatus set forth in claim 3 wherein said shunting means includes a normally open switch connected in parallel with said variable means and means for closing said switch upon the elapse of a predetermined period of time.

5. The apparatus set forth in claim 1 wherein the means in said control circuit operable to energize the latter includes a relay and wherein said switch device in said motor circuit is actuated by said relay.

6. Overload control apparatus for an electric motor requiring a starting current higher than its normal operating current, said apparatus comprising a motor circuit including a normally closed switch device connecting said motor to a source of electrical energy; start and stop switch means in said circuit adapted selectively to connect and disconnect said motor to and from said source; a meter circuit connected at all times to said motor circuit and operable to measure the current supplied thereto; a normally disabled control circuit; means connecting said control circuit to a source of electrical energy for operation independently of said motor circuit, said control circuit including means operable in response to the current in said motor circuit reaching a value greater than its said normal operating current to energize said control circuit from its said source of energy to open and hold open said normally closed switch device in said motor circuit and disconnect the latter from its source of energy; and means forming part of said meter circuit operable to delay energization of said control circuit during starting of said motor.

7. The apparatus set forth in claim 6 wherein said delay means comprises a resistance connected in series with said meter circuit and a shunt device for said resistance responsive to a predetermined lapse of time to shunt said resistance.

8. The apparatus set forth in claim 7 wherein said shunt device includes a normally open switch in parallel with said resistance and a time responsive mechanism operable to close said normally open switch.

9. The apparatus set forth in claim 7 wherein said resistance is variable.

References Cited in the file of this patent

UNITED STATES PATENTS

| | | |
|---|---|---|
| 1,136,657 | Date | Apr. 20, 1915 |
| 1,652,346 | Burnham | Dec. 13, 1927 |
| 2,010,701 | Richardson | Aug. 6, 1935 |
| 2,677,076 | James | Apr. 27, 1954 |
| 2,727,202 | Lanfers et al. | Dec. 13, 1955 |

FOREIGN PATENTS

| | | |
|---|---|---|
| 499,512 | Great Britain | Jan. 25, 1939 |